United States Patent
Grossmann et al.

(10) Patent No.: US 9,454,138 B2
(45) Date of Patent: Sep. 27, 2016

(54) METHOD AND APPARATUS FOR CONDUCTING A PLAUSIBILITY CHECK ON A POSITION OF AN ACTUATING ELEMENT OF A POSITION ENCODER SYSTEM WITH AN ELECTRONICALLY COMMUTATED ELECTRIC MACHINE

(71) Applicant: Robert Bosch GmbH, Stuttgart (DE)

(72) Inventors: Alex Grossmann, Leonberg (DE); Reiner Schweinfurth, Eppingen (DE); Udo Sieber, Bietigheim (DE); Ralf Buehrle, Hochberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/408,361

(22) PCT Filed: May 8, 2013

(86) PCT No.: PCT/EP2013/059660
§ 371 (c)(1),
(2) Date: Dec. 16, 2014

(87) PCT Pub. No.: WO2014/000934
PCT Pub. Date: Jan. 3, 2014

(65) Prior Publication Data
US 2015/0115861 A1    Apr. 30, 2015

(30) Foreign Application Priority Data
Jun. 25, 2012    (DE) .................. 10 2012 210 729

(51) Int. Cl.
*G05B 11/00* (2006.01)
*G05B 13/02* (2006.01)
*H02P 6/16* (2016.01)

(52) U.S. Cl.
CPC ............. *G05B 13/021* (2013.01); *G05B 11/00* (2013.01); *H02P 6/16* (2013.01)

(58) Field of Classification Search
CPC .................................................. G05B 13/021
USPC ........................................... 318/561, 560, 34
See application file for complete search history.

(56) References Cited

U.S. PATENT DOCUMENTS

| 6,005,365 A * | 12/1999 | Kaneko et al. ............... 318/700 |
| 7,463,006 B2 * | 12/2008 | Ta .......................... B62D 5/046 318/807 |
| 8,395,345 B2 * | 3/2013 | Imamura et al. ............ 318/650 |
| 8,786,222 B2 * | 7/2014 | Wolf et al. ............... 318/400.02 |

(Continued)

FOREIGN PATENT DOCUMENTS

| JP | 2003-214198 A | 7/2003 |
| JP | 2008-253088 A | 10/2008 |

(Continued)

OTHER PUBLICATIONS

International Search Report corresponding to PCT Application No. PCT/EP2013/059660, mailed Aug. 12, 2014 (German and English language document) (5 pages).

*Primary Examiner* — David S Luo
(74) *Attorney, Agent, or Firm* — Maginot, Moore & Beck LLP

(57) ABSTRACT

A method for operating a position encoder system includes performing a closed loop position control based on a detected first position indication of a position of an actuating element. The performing of the closed loop position includes generating a position correcting variable and allocating a space vector the position correcting variable to enable an adjustment drive to be controlled. The method further includes performing a check on the first position indication or correcting the first position indication with the allocated space vector. An adjustment drive is configured to adjust the actuating element. The actuating device includes a rotating electronically commuted motor. The motor has a rotor and an electronic rotor position of the rotor is configured to be allocated to multiple positions of the actuating element.

10 Claims, 1 Drawing Sheet

(56) References Cited

U.S. PATENT DOCUMENTS

2004/0061461 A1    4/2004    Tajima et al.
2011/0273127 A1    11/2011    Imamura et al.

FOREIGN PATENT DOCUMENTS

| JP | 2009-36108 A | 2/2009 |
| JP | 2010-220349 A | 9/2010 |

* cited by examiner

METHOD AND APPARATUS FOR CONDUCTING A PLAUSIBILITY CHECK ON A POSITION OF AN ACTUATING ELEMENT OF A POSITION ENCODER SYSTEM WITH AN ELECTRONICALLY COMMUTATED ELECTRIC MACHINE

This application is a 35 U.S.C. §371 National Stage Application of PCT/EP2013/059660, filed on May 8, 2013, which claims the benefit of priority to Serial No. DE 10 2012 210 729.0, filed on Jun. 25, 2012 in Germany, the disclosures of which are incorporated herein by reference in their entirety.

The present disclosure relates to position encoder systems in general, in particular to position encoder systems in which a transmission ratio is provided between the adjusting drive and the actuating element and a closed loop position control is performed based on a position detector of the actuating element.

BACKGROUND

Position encoder systems such as by way of example valve position encoder systems for use in a motor system having an internal combustion engine comprise a position detector in order to detect the position of the actuating element, in other words the valve, and thus render possible a redundant check of the position of the actuating element. In the case of position encoder systems of this type, a transmission ratio is often provided between an adjustment drive and the actuating element and by means of said transmission ratio an adjustment of the actuating element is effected by means of multiple rotations of the adjustment drive. The transmission ratio consequently renders it possible to exert a high adjustment torque or rather a high adjustment force on the actuating element.

Electronically commutated motors can be provided as an adjustment drive. Adjustment drives of this type require that information regarding the rotor position of the rotor of the motor is provided for an optimal commutation. In the case of closed loop position controls that control the position of the actuating element and use a rotor position that is recalculated from the position of the actuating element for the purpose of controlling the motor, it is disadvantageous that, as a result of the transmission ratio, the information regarding the rotor position is only provided with an accuracy that is insufficient for an optimal commutation of the adjustment drive.

The object of the present disclosure is to provide a method for performing a plausibility check on, or correcting, a position indication of an actuating element in a position encoder system and said method is performed without a position sensor that is arranged directly on the adjustment drive.

SUMMARY

This object is achieved by means of the method for performing a plausibility check on, or correcting, a measured position indication of an actuating element of a position encoder system in accordance with claim 1 and also by means of the apparatus, the position encoder system, the computer program and the computer program product in accordance with the coordinated claims.

Further advantageous embodiments of the present disclosure are disclosed in the dependent claims.

In accordance with a first aspect, a method for operating a position encoder system is provided, wherein an actuating element can be adjusted by way of an adjustment drive that comprises a rotating electronically commutated motor and wherein an electric rotor position of a rotor of the adjustment drive can be allocated to multiple positions of the actuating element, said method having the following steps:
    performing a closed loop position control based on a detected position indication regarding a position of the actuating element, wherein a position correcting variable is generated and a space vector is allocated to said position correcting variable for the purpose of controlling the adjustment device,
    performing a plausibility check on, or correcting, the position indication by means of the space vector that is allocated to the position correcting variable that is generated.

One idea of the above method is, in the case of a closed loop position controlled position encoder system, to use the space vector that is predetermined by means of the closed loop position control or rather by means of the commutation scheme for the purpose of controlling the electronically commutated adjustment drive as information regarding a rotor position of the adjustment drive and from said information to determine possible positions of the actuating element by taking into consideration a predetermined transmission ratio. A position indication for the position of the actuating element, said position indication being provided by a position detector that is coupled to the position encoder system, can only be checked for its plausibility or rather corrected by means of the position of the actuating element, wherein the position indication that most likely corresponds to the rotor position that is controlled is selected as a valid position indication. This is rendered possible by means of reliably allocating the rotor position to the actual position of the actuating element.

It is possible in this manner, even in the case of a position detector for the purpose of determining a position indication regarding the position of the actuating element with a low level of accuracy as a result of reliably allocating a rotor position to the position of the actuating element, to perform a plausibility check on, or correct, the determined position of the actuating element.

Furthermore, the position indication can be corrected in that the position indication that is used for the closed loop position control is replaced by a position indication that lies closest to the rotor position that is allocated to the space vector.

In accordance with one embodiment, the position indication can be corrected in that the position indication that is used for the closed loop position control is influenced using a position indication that lies closest to the rotor position that is allocated to the space vector.

It can be provided that the position indication that is used for the closed loop position control is checked using a position indication that lies closest to the rotor position that is allocated to the space vector.

Furthermore, the position indication that is detected can be corrected in accordance with a correcting function, wherein the corrected, detected position indication is further corrected corresponding to a position indication that lies closest to the rotor position that is allocated to the space vector.

In accordance with a further aspect, an apparatus is provided for the purpose of operating a position encoder system, wherein an actuating element can be adjusted by way of an adjustment drive that comprises a rotating electronically commutated motor and wherein an electric rotor position of a rotor of the adjustment drive can be allocated to multiple positions of the actuating element, wherein the apparatus is embodied in order to:

perform a closed loop position control based on a detected position indication regarding a position of the actuating element, wherein a position correcting variable is generated and a space vector is allocated to said position correcting variable for the purpose of controlling the adjustment drive; and perform a plausibility check on, or to correct, the position indication by means of the space vector that is allocated to the position correcting variable that is generated.

In accordance with a further aspect, a position encoder system is provided, comprising an adjustment drive that comprises a rotating electronically commutated motor an actuating element that can be adjusted by way of the adjustment drive and is coupled to the adjustment drive in such a manner that an electric rotor position of a rotor of the adjustment drive can be allocated to multiple positions of the actuating element; and the above apparatus.

In accordance with a further aspect, a computer program having programming code means is provided in order to perform all the steps of the above method if the computer program is implemented on a computer or the above apparatus.

In accordance with a further aspect, a computer program product is provided that includes a program code that is stored on a data storage medium that can be read by a computer and that performs the above-mentioned method if said program code is implemented on a data processing device.

BRIEF DESCRIPTION OF THE DRAWINGS

Preferred embodiments of the present disclosure are further described hereinunder with reference to the attached drawings. In the drawings.

DETAILED DESCRIPTION

Figure 1:
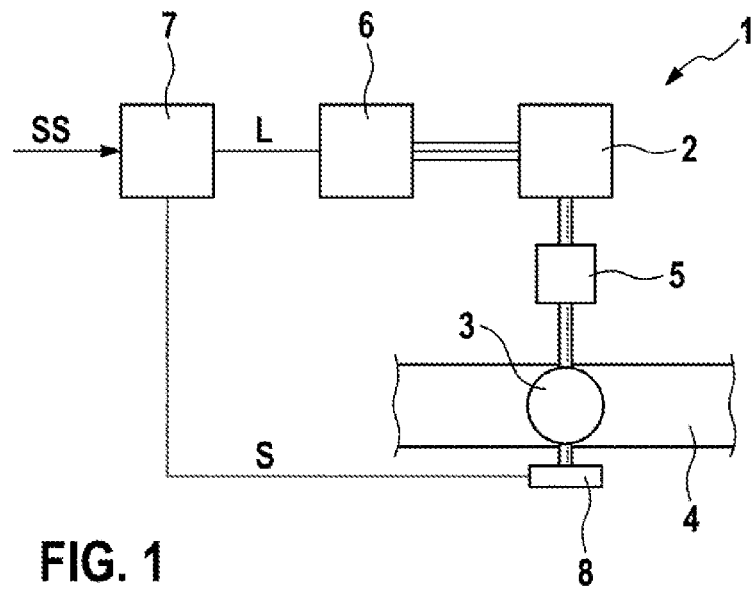
FIG. 1 illustrates schematically a position encoder system having an electronically commutated adjustment drive that is connected by way of a transmission to an actuating element that is to be adjusted.

FIG. 1 illustrates schematically a position encoder system 1, in particular a restrictor valve position encoder for a fresh air intake system of a motor system having an internal combustion engine. The position encoder system 1 comprises an adjustment drive 2 that can be embodied as a rotating, electronically commutated electric motor. The adjustment drive 2 is used for the purpose of adjusting an actuating element 3 that is embodied in the illustrated exemplary embodiment as a valve in an intake pipe 4.

The actuating element 3 can be rotated, pivoted or rather adjusted in any other way. In the case of a valve as an actuating element 3, pivoting causes the cross section of an opening in the intake pipe 4 to be varied. The adjustment drive 2 is coupled for this purpose to the actuating element 3 by way of a transmission 5 that comprises a transmission ratio. In the present exemplary embodiment, the valve is provided as the actuating element 3 for a pivoting movement of 90°. This pivoting movement of the actuating element 3 is achieved by means of a number of rotations of a rotor (not illustrated) of the adjustment drive 2. In other words, a rotation of the rotor of the adjustment drive 2 corresponds to an adjustment of the actuating element 3 by a specific angle that is derived from the transmission ratio of the transmission 5.

The adjustment drive 2 comprises an electronically commutated electric motor, in particular a three phase electrical machine that is controlled by a driver circuit 6. The driver circuit 6 generates phase voltages for the adjustment drive 2 in order to predetermine a voltage vector (space vector) for the adjustment drive 2, which voltage vector at least in the case of being stationary leads to the rotor being aligned corresponding to (parallel to) the predetermined space vector. The voltage vector leads to a buildup of a magnetic field that is parallel to the space vector and the exciting magnetic field that is generally generated by rotor poles tries to align itself with said magnetic field.

The voltage vector is defined by means of an amplitude (voltage level) and a space vector direction. The space vector that is predetermined by means of the phase voltages is based on a position correcting variable L of a control unit 7. A commutating method can be performed in the driver circuit 6 for this purpose and said method provides the space vector by means of applying the phase voltages corresponding to a commutating pattern.

The control unit 7 is connected to a position detector 8 that is arranged near to the actuating element 3 and provides a position indication S regarding the position of the actuating element 3. The function of the position detector 8 can be based on optical, magnetic or similar measuring methods. Generally, the position detector 8 comprises an encoder wheel that is coupled to the actuating element 3 and also a sensor that detects a movement of the encoder wheel and outputs a corresponding position changing signal. The position changing signal can then be converted into the position indication S in the position detector 8 for example by means of summation.

The control unit 7 performs a closed loop position control based on the position indication regarding the position of the actuating element 3 and said closed loop position control provides the position correcting variable L that is communicated as a correcting variable to the driver circuit 6. The closed loop position control can be based on an externally predetermined desired position SS corresponding to a conventional closed loop position control and can comprise a proportional component and/or a differential component and/or an integral component. The closed loop position control can determine a space vector as a correcting variable that is converted to phase voltages so that a correspondingly aligned magnetic field is formed. The rotor of the adjustment drive 2 is aligned corresponding to the aligned magnetic field.

In an alternative embodiment, the closed loop position control can however also change an adjacent space vector incrementally in amplitude and/or direction without the need to determine a correcting variable that predetermines an absolute position of the space vector. In this case, a position can be recalculated from the phase voltages that are applied by the driver circuit 6.

The control device 7 can furthermore include a correcting function that by means of suitable adaptive methods improves the accuracy of the position indication S that is used for the closed loop position control. By way of example a correcting method can be performed with the aid of a correcting variable. The correcting variable is ascertained in that additionally the space vector is varied with respect to the position correcting variable L with which the adjustment drive 2 is controlled. The correcting variable corresponds to an integration value that is derived from integrating a value that depends upon an auxiliary signal and a correcting variable from a closed loop position control that is performed in the control device 7.

Figure 2:
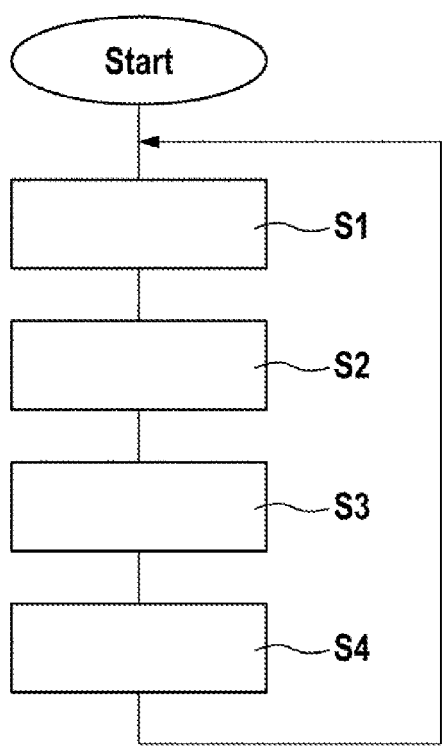
FIG. 2 illustrates a flow diagram for the purpose of exemplifying a method for performing a plausibility check on, or rather correcting, information regarding the position of a rotor.

A method is provided in order to perform a plausibility check on, or to correct, the ascertained position indication S and said method is described hereinunder in connection with the flow diagram in FIG. 2.

The method in FIG. 2 provides that in step S1, initially a position indication S is received from the position detector 8. In a subsequent step S2, this position indication S can be corrected by means of a suitable, optional correcting function.

It is possible in step S3 to repeat the correction of, or plausibility check on, the corrected position indication S based on the position correcting variable L that is actually transmitted to the driver circuit 6 and that determines the actual space vector for the purpose of controlling the adjustment drive 2. This correction or plausibility check is performed in that multiple possible positions of the actuating element 3 are allocated to the position correcting variable L that determines the space vector and leads to an electric rotor position of the adjusting drive 2 and depends upon the pole pair number of the electrical machine of the adjustment drive 2 and the transmission ratio of the transmission 5.

By way of example, in the case of the above mentioned position encoder system having a possibility of adjusting the actuating element 3 by approximately 90°, and having a transmission 5 that allocates an adjustment of the actuating element 3 by 20° to a rotation of the adjustment drive 2, possible positions of the actuating element 3 of 10°±1°, 30°±1°, 50°±1°, 70°±1° and 90°±1° can be allocated to said adjustment drive by means of the space vectors that are predetermined by means of the position correcting variable L. If the determined position indication S of the actuating element 3 corresponds to 29.5°±1.5°, then a position of the actuating element 3 of 30°±1° can thus be assumed by means of the allocated position correcting variable since the allocation of the rotor position to the position of the actuating element 3 can clearly be assumed by means of the fixed-ratio transmission 5.

Step S3 comprises either a plausibility check of the value that is provided by means of the position indication S or rather by means of the position indication S that has been corrected by means of a correcting function, or the position indication S can be adjusted or corrected to the position of the actuating element 3 that is allocated accordingly to the position correcting variable L that is provided by means of the closed loop position control, said position of the actuating element 3 being the position that most likely corresponds to the position indication S of the position detector 8.

The thus ascertained corrected and plausibility-checked position indication S can be used as an input variable for the closed loop position control in step S4, from which a new position correcting variable L is derived for the purpose of controlling the adjustment drive 2 by way of the driver circuit 6. This method is repeated so that on the one hand a permanent correction of the position indication S is performed with independent correcting methods and on the other hand a plausibility check or rather a correction is performed by means of the actually applied space vector or rather the position correcting variable L of the preceding closed loop control cycle.

The invention claimed is:

1. A method for operating a position encoder system, the position encoder system having an adjustment drive configured to adjust an actuating element, the adjustment drive including an electronically commutated motor having a rotor, each possible position of the rotor corresponding to multiple possible positions of the actuating element, the method comprising:
    performing a closed loop position control of the actuating element, the performing of the closed loop position control including:
        detecting a first position indication of the actuating element;
        generating a position correcting variable based on the detected first position indication;
        allocating a space vector to the position correcting variable; and
        controlling the adjustment drive with the allocated space vector; and
    at least one of (i) performing a plausibility check on the first position indication using the allocated space vector and (ii) correcting the first position indication using the allocated space vector.

2. The method as claimed in claim 1, wherein the correcting of the first position indication includes:
    correcting the first position indication by replacing the first position indication with a second position indication, the second position indication being a position of the actuating element that corresponds to a rotor position that is closest the allocated space vector.

3. The method as claimed in claim 1, wherein the correcting of the first position indication includes:
    correcting the first position indication by influencing the first position indication with a second position indication, the second position indication being a position of the actuating element that corresponds to a rotor position that is closest the allocated space vector.

4. The method as claimed in claim 1, wherein the performing of the plausibility check includes:
    performing the plausibility check on the first position indication by comparing the first position indication with a second position indication, the second position indication being a position of the actuating element that corresponds to a rotor position that is closest the allocated space vector.

5. The method as claimed in claim 1, wherein the correcting of the first position indication includes:
    correcting the first position indication with a correcting function; and
    correcting the corrected first position indication with reference to a second position indication, the second position indication being a position of the actuating element that corresponds to a rotor position that is closest the allocated space vector.

6. The method as claimed in claim 1, wherein the detecting of the first position indication of the actuating element is performed with a position detector at the actuating element configured to detect a position of the actuating element.

7. An apparatus for operating a position encoder system, the position encoder system having an adjustment drive configured to adjust an actuating element, the adjustment drive including an electronically commutated motor having a rotor, each possible position of the rotor corresponding to multiple possible positions of the actuating element, wherein the apparatus is configured to:
perform a closed loop position control of the actuating element, the performing of the closed loop position control including:
detecting a first position indication of the actuating element;
generating a position correcting variable based on the detected first position indication;
allocating a space vector to the position correcting variable; and
controlling the adjustment drive with the allocated space vector; and
at least one of (i) perform a plausibility check on the first position indication using the allocated space vector and (ii) correct the first position indication using the allocated space vector.

8. A position encoder system comprising:
an adjustment drive including a rotating electronically commutated motor, the motor having a rotor, and the rotor having an electric rotor position;
an actuating element configured to be adjusted using the adjustment drive and coupled to the adjustment drive such that each possible position of the rotor corresponds to multiple possible positions of the actuating element; and
an apparatus configured to:
perform a closed loop position control of the actuating element, the performing of the closed loop position control including:
detecting a first position indication of the actuating element;
generating a position correcting variable based on the detected first position indication;
allocating a space vector to the position correcting variable; and
controlling the adjustment drive with the allocated space vector; and
at least one of (i) perform a plausibility check on the first position indication using the allocated space vector and (ii) correct the first position indication using the allocated space vector.

9. The position encoder system of claim 8, wherein the apparatus has a computer program having program code configured to (i) perform the closed loop position control and (ii) perform the at least one of the plausibility check and the correcting.

10. The position encoder system of claim 9, wherein the computer program is stored on a non-transitory data storage medium that is read by the apparatus.

* * * * *